Patented Mar. 10, 1936

2,033,856

UNITED STATES PATENT OFFICE 2,033,856

COMPOUNDS OF BENTONITE WITH ORGANIC BASES AND PROCESS OF PRODUCING SAME

Claude R. Smith, Washington, D. C.

No Drawing. Application July 5, 1934,
Serial No. 733,863

10 Claims. (Cl. 260—25)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to compounds of bentonite with organic bases, particularly to compounds of bentonite with organic bases that are sufficiently basic as to be titratable with mineral acids. Among these reactive bases are found many alkaloids, cyclic amines, aliphatic amines, and heterocyclic amines.

After extensive study I have found that bentonite reacts with organic bases to form compounds principally by the process of base exchange in which the calcium, sodium, and possibly other metallic cations of the clay enter into double decomposition with the cations of organic bases. I have further found that essentially the only requirement for reaction to take place is that the base be alkaline in water solution so that an approximate titration can be made with mineral acids. Bases of the stronger type such as piperidine, strychnine, amylamine, diamylamine, anabasine, arecoline, and others react readily. Weak bases such as aniline and pyridine are essentially non-reactive under the conditions governing this invention. Hydroxylamine, hydrazine and other bases with slightly basic properties will react but not with the ease or completeness of the stronger bases.

The applicant has found that a maximum proportion of organic base can be introduced into bentonite depending on the chemical equivalence of the base. With organic bases it is sometimes difficult to attain this maximum probably due to insufficient ionization of the organic salts. This maximum is approximately realized when increasing amounts of the organic salt are used in excess of the quantity to be combined. One gram of a bentonite sample, for example, combined with 0.64 millimols of strychnine, piperidine, amylamine, diamylamine, etc. In the case of such weak bases as hydrazine, hydroxylamine, etc., the maximum absorption is not attained under the procedures outlined. A base is shown to be reactive when its salts produce flocculation of a bentonite suspension. Flocculation takes place just before and after the base has saturated the bentonite.

The process employed in obtaining the bentonite organic base compounds consists in bringing together bentonite and organic bases or their salts in the presence of water. The combination with the free bases is much less than when the salts of the bases are employed. The maximum combination appears to result when the whole reacts acid to an indicator such as methyl orange. With weak bases bentonite combines with the full proportion only when repeatedly brought into contact with fresh portions of their salts thereby removing interfering inorganic salts particularly those of calcium. Competing bases of either inorganic or organic type should not be present if the greatest proportion of a given base is to be combined.

*Example I.*—Fifty grams of bentonite are brought into intimate contact with three grams of piperidine previously neutralized with mineral acid and contained in two litres of water. The extent of combination depends on the natural alkalinity and chemical characteristics of the bentonite. Ordinarily about fifty percent of the piperidine will be found combined.

*Example II.*—Fifty grams of bentonite are brought into intimate contact with three grams of piperidine previously neutralized with mineral acid together with additional acid so that the resulting mixture reacts acid to methyl orange indicator and contained in two litres of water. The combination is now increased to about seventy-five percent.

*Example III.*—Fifty grams of bentonite are brought into intimate contact with three grams of piperidine previously neutralized with mineral acid together with additional acid so that the resulting mixture is acid and contained in two litres of water. The solid material is filtered and washed with fresh portions of piperidine solutions neutralized with strong acid. After washing quickly with water and drying the piperidine content often reaches about six percent.

*Example IV.*—Fifty grams of bentonite are brought into intimate contact with ten grams of strychnine previously made into the sulphate or hydrochloride contained in two litres of water with a sufficient excess of mineral acid to neutralize the bentonite. The flocculated material is filtered and washed with a solution of three or four grams of strychnine formed into the hydrochloride or sulphate and finally with pure water. The bentonite compound is dried and contains about ten percent of strychnine.

This invention is particularly concerned with the procedures necessary to effect the combination of bentonite with organic bases. It is understood that filtration, washing with water, and drying to prepare the compounds in suitable form may be employed when desired.

Compounds of bentonite with organic bases are useful in the treatment of human and animal diseases where a delayed action of the drug is desired. For example in the expulsion of parasites in the intestines the delayed action of arecoline is desired.

I claim:

1. The method of preparing piperidine-bentonite compounds which comprises bringing together bentonite and piperidine in the presence of water.

2. A method of preparing strychnine-bentonite compounds which comprises bringing together bentonite and strychnine in the presence of water.

3. Compounds of bentonite with piperidine resulting from bringing together bentonite and piperidine in the presence of water.

4. Compounds of bentonite and strychnine resulting from bringing together bentonite and strychnine in the presence of water.

5. The method of preparing organic base-bentonite compounds which comprises bringing together in the presence of water, bentonite and organic bases of sufficient alkalinity to be titratable with mineral acids.

6. The method of preparing organic base-bentonite compounds which comprises bringing together bentonite and such organic bases as are capable in their salt forms of producing flocculation of bentonite suspensions, in the presence of water and an amount of acid sufficient to neutralize the base and the natural alkalinity of the bentonite.

7. The method of preparing organic base-bentonite compounds which comprises bringing together bentonite and such organic bases as are capable in their salt forms of producing flocculation of bentonite suspensions, in the presence of water and an amount of acid sufficient to neutralize the base and the natural alkalinity of the bentonite, followed by washing with a salt of the organic base.

8. Compounds of bentonite with organic bases of sufficient alkalinity to be titratable with mineral acids which compounds are made by bringing together bentonite and such organic bases in the presence of water.

9. Compounds of bentonite with such organic bases as are capable in their salt forms of producing flocculation of bentonite suspensions which compounds are made by bringing together bentonite and such organic bases in the presence of water with the addition of acid in an amount sufficient to neutralize the base and the natural alkalinity of the bentonite.

10. Compounds of bentonite with such organic bases as are capable in their salt forms of producing flocculation of bentonite suspensions which compounds are made by bringing together bentonite and such organic bases in the presence of water and the addition of acid in an amount sufficient to neutralize the base and the natural alkalinity of the bentonite followed by washing with a salt of the organic base employed.

CLAUDE R. SMITH.